Oct. 31, 1933.  J. H. HALL  1,933,523
APPARATUS FOR CONTROLLING ELECTRIC MOTORS
Filed Nov. 3, 1928
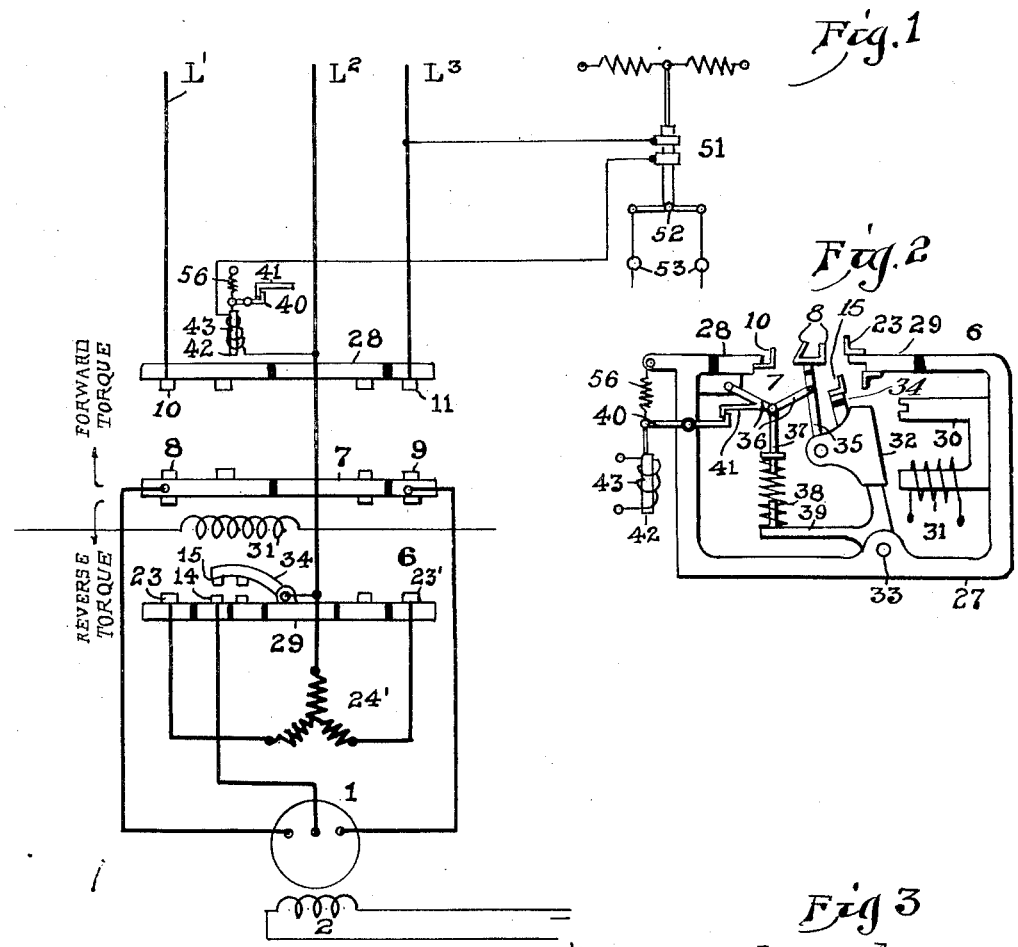
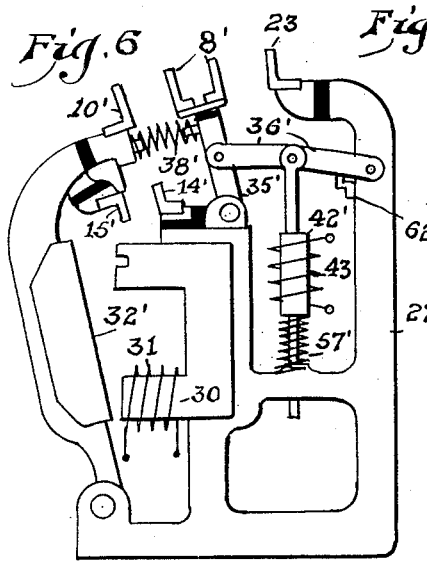
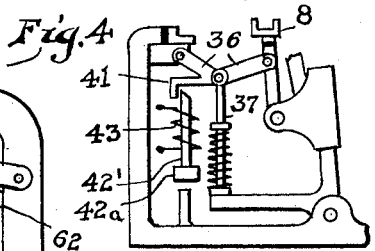
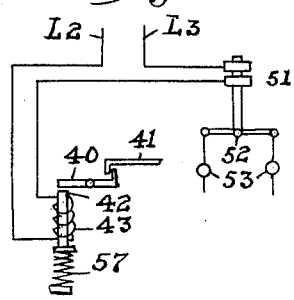
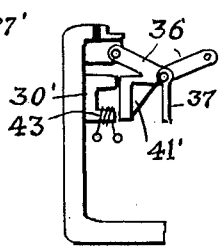
INVENTOR
Jay H. Hall
by F. N. Barber
Attorney Patented Oct. 31, 1933

1,933,523

UNITED STATES PATENT OFFICE 1,933,523

APPARATUS FOR CONTROLLING ELECTRIC MOTORS

Jay H. Hall, Cleveland Heights, Ohio, assignor to The Electric Controller & Manufacturing Company, Cleveland, Ohio, a corporation of Ohio Application November 3, 1928. Serial No. 317,082

14 Claims. (Cl. 200—98)

The invention relates broadly to electric circuit controlling apparatus for electric motors, and more particularly to apparatus for stopping electric motors.

One of the objects of the invention is to provide a device which, while the motor is running in one direction, will cause to be developed within the motor a reverse torque to bring the rotating parts to rest. Another object is to provide a device which is adapted to cause an electric motor to develop a reverse torque due either to dynamic braking currents generated by the motor or to currents drawn from the line, which will tend to cause opposite rotation of the motor. Another object is to cause a synchronous motor to be stopped quickly by dynamic braking or applying reverse power to its terminals, the stopping being subject to emergency control in case of an accident to an operative of the machinery driven by the motor. The device is equally applicable to the stopping of a squirrel-cage motor by applying reverse power to its terminals for the same purpose. Other objects pertaining to the apparatus are set forth hereinafter.

This application is a continuation in part of my application Serial No. 84,290, filed January 28, 1926 which became Patent No. 1,809,947 on June 16, 1931.

Referring to the accompanying drawing, Fig. 1 is a diagrammatic view of an apparatus embodying my invention and connected to a synchronous motor system with the motor at rest. Fig. 2 is an end view of the said apparatus looking at Fig. 1 from the left. Figs. 3, 4 and 5 show diagrammatically modifications of the tripping devices for the main switch. Fig. 6 shows another form the said apparatus may take.

Referring first to Figs. 1 and 2, 1 designates the armature of a synchronous motor having the field winding 2, the latter being supplied with current from a D. C. source.

6 is a switch having the movable member or bar 7 carrying contacts 8 and 9 which in the forward torque position of the switch engage the fixed contacts 10 and 11 of the supply lines L' and L3, the third supply line L2 being simultaneously connected to the third motor lead through the contacts 14 and 15, as hereinafter explained.

When the switch 6 moves to the forward torque position, the contacts 8 and 9 on the member 7 engage the fixed contacts 10 and 11, and when the switch 6 moves to the reverse torque position the contacts 8 and 9 on the member 7 engage the fixed contacts 23 and 23'. When the switch 6 is in forward and reverse torque positions the contacts 14 and 15 are held closed.

The apparatus for operating the switch 6 is shown in Fig. 2, now to be described in connection with parts thereof shown in Fig. 1. The U-shaped frame 27 has at opposite sides of the space between its side members the fixed bars 28 and 29, the former supporting the contacts 10 and 11, and the latter the contacts 14, 23 and 23'. The frame carries the pole pieces 30 energizable by the winding 31 for causing the armature 32 pivoted on the frame at 33 to move toward the pole pieces. The armature carries the support 34 on which the contact 15 is mounted.

The armature 32 carries the arm 35 pivoted thereto and carrying the member 7 at its upper end. The arm 35 and a fixed block beneath the bar 28 support the end pivots of two toggle links or arms 36 normally flexed downwardly, the pivot connecting their adjacent ends carrying the rod or plunger 37 resting on the helical spring 38, the lower end of the spring being supported by the arm 39 projecting from the hub of the armature 32.

Frame 27 supports the tripping lever 40, having one end provided with a catch or hook for interlocking with the horizontal hook 41 carried by one link of the toggle mechanism 36. The other end of the lever is attached to the magnetic plunger 42 in the winding 43. The spring 56 normally holds the lever 40 unlatched from the hook 41. When the winding 43 is energized, the lever 40 is turned so as to position its hook in front of the hook 41 and thereby hold the hook in such a position that, when the armature 32 is actuated, the contacts 8 and 9 supported by the member 7 will engage the contacts 10 and 11 supported by the member 28.

The emergency switch 51 is located conveniently for operation in case of an emergency, requiring the stopping of the motor. This switch turns on the pivot 52 and is operated by either of the handles 53. The contacts of the switch 51 are connected across the supply lines L2 and L3 in series with the winding 43, connected to the line L2.

The circuit containing the winding 43 is a safety circuit which for normal operation must be closed to allow the latch 40 and the hook 41 to become interlocked before the motor can be connected to develop forward torque for the operation of the machine to which it is connected.

The operation of Figs. 1 and 2 is as follows: Suitable current is fed to the winding 31 and energizes the pole pieces 30, which thereupon attracts the armature 32. The contact 15 engages the contact 14, thereby connecting the line L2 to the motor 1. The hook 41 is held from moving to the right by the hook on the lever 40 which has been moved up into locking position by the downward pull of the plunger 42 in the winding energized by current through the closed contacts of the switch 51. As the toggle links 36 are held from moving to the right the arm 35 turns on its pivotal connection with the right hand toggle link 36 so that the contacts 8 and 9 move to the left and engage the contacts 10 and 11. The movement of the arm 39 compresses the spring 38, which thereafter tends to straighten out the toggle links and move the contact-carrying bar 7 to the right.

When the contacts 8 and 9 engage the respective contacts 10 and 11, the motor 1 is connected to the supply lines L', L2 and L3. The switch 6 is now in its forward torque position, and the motor operates to perform its required normal working function.

In case the machinery driven by the motor has caused an accident to the operative or other person, one of the handles 53 is pulled down which opens the contacts of the switch 51. The opening of these contacts opens the circuit of the winding 43, whereupon the released spring 56 at once pulls the hook of the lever 40 away from the hook 41. Then the spring 38 is freed and causes the toggle links to straighten out and move the bar 7 carrying the contacts 8 and 9 to the right so that the contacts 8 and 9 leave the contacts 10 and 11 and engage the contacts 23 and 23' respectively. Thus the motor is disconnected from the current supply lines and connected in a closed circuit in series with the stopping resistance 24'. The switch has now been moved to its reverse torque position. As the armature 32 still maintains its closed position, the contacts 14 and 15 remain closed so as not to leave the central lead of the motor disconnected from the resistance.

It is assumed that the motor was started as an induction motor and that later its closed field circuit was opened and that the field was connected to a source of direct current as specified in my said application and as is common with synchronous motor systems.

When the switch 6 is moved to its reverse torque position, the field winding 2 remains energized and a reverse torque develops in the motor which brings the motor quickly to rest.

When the circuit of the winding 31 is opened the armature 32 drops back to the left, causing the contact carrier bars 7 and 34 to move to the left, whereby the pairs 14—15, 8—23, and 9—23' of contacts are opened, the arm 39 dropping at the same time to relieve the spring 38 of tension so that the toggle links become flexed and hold the bar 7 centrally between the bars 28 and 29 with the motor and braking circuits open.

Since the winding 43 is deenergized as long as the emergency switch 51 is open, the latch 40 cannot engage the hook 41. Therefore, the motor can not be reconnected to the supply lines for developing forward torque in the motor while the emergency switch 51 remains open. If attempt is made to start the motor by energizing the winding 31 when the switch 51 is open, the armature 32 will close, but as the lever 40 is not engaged with the hook 41, the bar 7 will be moved so as to make the contacts 8 and 9 engage the contacts 23 and 23'. However, no current will flow in the motor circuits as it is not connected to the supply lines and no damage will result. The open contacts of the switch 51 or a failure in the circuit of the winding 43 acts as a safety means to prevent the starting of the motor. In case an operative has his fingers or arm caught in the machinery which the motor is driving, there is no danger of further injuring the fingers or hand by the starting of the motor as long as he holds the switch 51 open.

In Fig. 3 the parts are as in Fig. 1 except that the up-pulling spring 56 has been replaced by the up-pushing spring 57. The closing of the switch 51 admits current to the winding 43 which generates a flux pulling the plunger down and compressing the spring as shown. When the switch 51 is opened, the spring pushes the plunger upwardly. The plunger then engages the lever 40 and unlatches it from the hook 41.

In Fig. 4, the winding 43 when energized pulls the plunger 42' up so that its upper end moves into the path of the hook 41 during its travel to the right. When the switch 51 is opened to open the circuit of the winding 43, the plunger drops and moves its upper end out of the path of the hook, permitting the toggle links 36 to straighten out and move the switch to its reverse torque or dynamic braking position. A weight 42a is provided on the plunger to assist it to drop.

In Fig. 5, the hook on the left hand toggle arm 36 has been modified to form an armature 41' which is held against the pole pieces 30' energized by the winding 43. While the switch 51 is closed the armature 41' is held to the pole pieces 30' so that the toggle members 36 cannot straighten out. When the switch 51 is opened, the winding 43 is deenergized and the switch 6 is free to close the reverse torque or braking circuit.

A modification of Fig. 2 is shown in Fig. 6, in which the magnet poles 30 energized by the winding 31 attract the armature 32' and cause the contact 10' to engage the contact 8' and compress the spring 38'; also, the contacts 15' to engage the contacts 14'. The contact 8' supported by the pivoted member 35' is held in the position shown by the toggle links 36' as long as the winding 43 is energized, compressing the spring 57'; the position of plunger 42' being shown with the winding 43 energized. The toggle links 36' engage the stop 62 on the frame 27' to prevent the links from locking, so that with the main spring 38' compressed, the deenergization of the winding 43 will allow the toggle links 36' to be unlatched by the spring 57' and the contacts 8' will be moved away from the contacts 10' by the spring 38' and engage the contacts 23. The contacts 14' and 15' remain closed as long as the winding 31 is energized.

If the winding 31 is deenergized the parts resume the positions shown in Fig. 6, the weight of the plunger 42' being such that the toggle links 36' allow the contact 8' to return to practically the position shown on the drawing. If the winding 43 is deenergized while the winding 31 is deenergized, the spring 38' will not cause the contacts 8' to engage the contacts 23, because the spring is too weak.

The mechanisms shown in Fig. 2 and Fig. 6 can be used in Fig. 1 in place of the switch shown in Fig. 2.

I claim:

1. In a circuit controller, the combination of two sets of electrical contacts, an electromagnet for closing one set of contacts and means operated upon by the electromagnet when energized setting up a bias for closing the other set of contacts, holding means for said bias normally out of holding position before the electromagnet is energized, and electro-responsive means adapted to be energized prior to the energization of the electromagnet for making the holding means effective.

2. In a circuit controller, the combination with two sets of contacts, an electromagnet for closing one set of contacts, and means operated by the electromagnet for setting up a bias for closing the other set of contacts, of mechanical holding means for said bias normally out of holding position before the electromagnet is energized and a winding for operating the mechanical holding means to effective position, said winding being adapted to be energized prior to the energization of the said electromagnet.

3. In a circuit controller, the combination with two sets of contacts, an electromagnet for closing one set of contacts, and means operated by the electromagnet for setting up a bias for opening said set of contacts and closing the other set of contacts when said bias is released, of holding means for the bias normally out of holding position adapted to be made effective before the energization of the electromagnet, said holding means also being adapted to be made ineffective without deenergizing the electromagnet.

4. In a circuit controller, the combination of three electrical contacts, an electromagnet for closing two of said contacts and means operated by the electromagnet for setting up a bias for closing the third contact, electro-responsive means for magnetically holding the bias, and means normally tending to release the holding means to open one of the closed contacts and close the third contact.

5. In a circuit controller, two sets of contacts, magnetically-operated means for effecting the closure of both sets of contacts, but one only at a time, and electro-responsive means energizable prior to the energization of the magnetically-operated means for causing the latter means when energized to close one of the sets of contacts, said electro-responsive means being adapted when deenergized while said magnetically-operated means is energized to cause the said latter means to effect the closure of the other set of contacts.

6. In a circuit controller, two sets of contacts, magnetically-operated means closing the sets of contacts in succession, normally unlatched latching means which when unlatched causes the said means to close one set of contacts, and electro-responsive means for magnetically operating the said latch mechanism to latched position whereby the said means may close the other set of contacts.

7. In a circuit controller, three sets of mechanically connected contacts, magnetically-operated means for closing the contacts in a selected order, and an electromagnetic means which when energized acts upon the said first means to cause it to mechanically effect the closure of two of the said sets of contacts, and when subsequently deenergized permits the said first means to effect the opening of one of the said sets of contacts and the closure of the said third set of contacts.

8. The combination of a movable member, magnetically-operated means for causing said member to engage either of two other members, normally unlatched latching means which when unlatched causes said magnetically-operated means when actuated to engage the movable member with one of said other members, and an electromagnet energized for latching the said latching means to cause the said magnetically-operated means to engage the movable member with the other of the said two members.

9. The combination of a movable member, a magnet, means operated thereby for causing the said movable member to occupy either of two operating positions, a latch mechanism connected to the said movable member, a spring tending to unlatch the latched mechanism, a second magnet acting upon the said latch mechanism in opposition to the spring whereby the said movable member is moved to one position when both magnets are energized, and means for causing said movable member to move from the said first position to the second position when the said second magnet is deenergized.

10. In a circuit controller, an operating winding, a contacting member operated thereby having an off position, an operating position and a safety position, a safety winding, means to effect the operation of the contacting member from the off position to the operating position only when the safety winding is energized prior to the energization of the operating winding, and means responsive to the deenergization of the safety winding to effect the operation of the contacting member from the operating position to the safety position whenever the contacting member is in the operating position.

11. In a circuit controlling device, a movable member, two contacts engageable thereby, a magnetically-operated means for causing the movable member to engage the contacts, one after the other, a winding, means controlled by magnetic flux set up by the winding for causing the said magnetically-operated means to engage the movable member with one of the contacts only when the winding is energized, and means for causing the said magnetically-operated means to engage the movable member with the other contact upon the deenergization of the said winding.

12. In a circuit controller, a set of normally open contacts, a normally unlatched latch, a winding for operating the latch to latched position, and an electromagnetic means, effective for closing the contacts only when the winding is energized.

13. In a circuit controller, a pair of contacts, a winding normally deenergized, a second winding normally energized, means operated by the second winding for permitting the first winding to close the contacts, and means whereby the first winding is rendered ineffective to close the contacts when the second winding is deenergized.

14. In a circuit controller, two sets of contacts arranged to close in a certain order, a winding normally deenergized, a second winding normally energized, means operated by the second winding for causing the first winding to close one set of said contacts, and means operated by the deenergization of the second winding, whereby the first winding closes the other set of contacts.

JAY H. HALL.